United States Patent [19]

Glukhovskoi et al.

[11] 4,153,647

[45] May 8, 1979

[54] PROCESS FOR PRODUCING-IMPACT POLYSTYRENE

[76] Inventors: Vladimir S. Glukhovskoi, ulitsa Tsiolkovskogo, 7/2, kv. 33; Fedor P. Afanasov, pereulok Prokhladny, 16; Valentin P. Shatalov, ulitsa Geroev Stratosfery, 1, kv. 4; Alexandr G. Kharitonov, ulitsa Perevertkina, 28, kv. 39; Ervin M. Rivin, Leninsky prospekt, 17, kv. 44; Jury S. Tsybin; Klavdia A. Kulakova, both of ulitsa Nikitinskaya, 19, kv. 22, all of Voronezh; Boris A. Dolgoplosk, Vystavochny pereulok, 3, kv. 36; Valerian M. Sobolev, naberezhnaya M. Gorkogo, 46/50, kv. 185, both of Moscow; Valery P. Kotov, ulitsa Karla Marxa, 72, kv. 9, Voronezh; Vasily V. Polyakov, Leninsky prospekt, 10, kv. 4, Voronezh; Anatoly P. Garshin, ulitsa Bolshaya Manezhnaya, 2, kv. 41, Voronezh; Vyacheslav G. Fil, Leninsky prospekt, 12, kv. 19, Voronezh; Stanislav V. Efremov, Leninsky prospekt, 10, kv. 31, Voronezh; Ivan P. Mitin, ulitsa Rostovskaya, 46/6, kv. 7, Voronezh; Vasily F. Kozlov, ulitsa Koltsovskaya, 17, kv. 47, Voronezh; Anna R. Gantmakher, Scherbakovskaya ulitsa, 16/18, kv. 203, Moscow; Dmitry K. Polyakov, 11 Parkovaya ulitsa 44, korpus 3, kv. 34, Moscow; Alexandr A. Arest-Yakubovich, 11 Parkovaya ulitsa, 44, korpus 3, kv. 111, Moscow; Raisa V. Basova, Izumrudnaya ulitsa, 38, kv. 17, Moscow, all of U.S.S.R.

[21] Appl. No.: 806,707

[22] Filed: Jun. 15, 1977

[51] Int. Cl.$^2$ ............................................. C08F 279/02
[52] U.S. Cl. .................................................. 260/880 R
[58] Field of Search ....................... 260/880 R, 880 B; 526/57, 41, 20

[56] References Cited

U.S. PATENT DOCUMENTS

| | | | |
|---|---|---|---|
| 2,772,254 | 11/1956 | Gleason | 526/57 |
| 2,880,190 | 3/1959 | Gleason | 526/57 |
| 3,445,543 | 5/1969 | Gruver | 260/880 R |
| 3,661,866 | 5/1972 | Schwarz | 526/57 |
| 3,790,547 | 2/1974 | Muller | 260/880 R |
| 3,806,557 | 4/1974 | Halasa | 260/880 R |
| 3,819,764 | 6/1974 | Halasa | 260/880 R |

*Primary Examiner*—Paul R. Michl
*Attorney, Agent, or Firm*—Lackenbach, Lilling & Siegel

[57] ABSTRACT

A process for producing high-impact polystyrene which comprises polymerization of styrene in the presence of a reinforcing agent, i.e. a conjugated diolefin polymer, random copolymer, graft-copolymer or block-copolymer of a conjugated diolefin with styrene or a mixture of said copolymers and an anionic catalyst based on organic derivatives of alkali metals or adducts thereof in a medium of inert hydrocarbon solvents such as aliphatic, cycloaliphatic and aromatic solvents or mixtures thereof. On completion of polymerization the resulting polymer is subjected to cross-linking by means of peroxide compounds or redox systems, followed by isolation of the desired product.

The process for producing high-impact polystyrene according to the present invention makes it possible to shorten the technological cycle due to increased polymerization rate, to facilitate production technology, and to manufacture polystyrene with improved properties.

9 Claims, No Drawings

PROCESS FOR PRODUCING-IMPACT POLYSTYRENE

The present invention relates to a process for producing high-impact polystyrene containing a polymeric reinforcing agent to modify the impact-strength of polystyrene. The resulting polystyrene finds wide application in mechanical engineering, in electrical engineering in radio engineering, in household goods, in construction, and other industries.

It is generally known that the major portion of commercially employed high-impact polystyrene is obtained by polymerization of styrene in the presence of different rubber-like polymers acting as reinforcing agents in high-impact polystyrene. Polymerization initiation is effected by means of free radicals (cf. Kunststoff-Handbuch Band 5. Polystyrol München, 1969).

Principal disadvantages of these prior art processes is that polymerization progresses slowly; it is accompanied by an abrupt increase of the reaction medium viscosity; it also requires high temperatures and results in products having an increased content of oligomers and residual monomer. The use of organic solvents for the purpose of reducing viscosity of the reaction medium results in a lowered polymerization rate, as well as molecular weight and yield of polystyrene.

It is known that polymerization of styrene may be conducted at a high rate to a very high conversion degree in a medium of organic liquids dissolving the monomer and not dissolving the resulting polystyrene in the presence of polymeric dispersing agents and anionic catalysts. During the polymerization process the resulting polystyrene is distributed over the organic liquid medium in the form of dispersed particles containing the polymeric dispersing agents. Isolation of the thus-produced polystyrene may be effected by way of filtration, decantation or as a result of evaporation of the organic liquid which constitutes the dispersing medium. As the medium for performing said processes, use is made of aliphatic or monoolefinic hydrocarbon solvents, while as the catalysts, use is made of organic compounds of alkali metals or adducts thereof. The polymeric dispersing agents employed in the prior art processes such as natural or synthetic rubber, polymers of conjugated diolefins or copolymers thereof with styrene simultaneously act as reinforcing agents for the polymer thus obtained.

However, impact resistance of such a polymer is inferior to that of the products obtained as a result of radical polymerization.

The properties of said polymer are improved in the case where the dispersing agent in processes of anionic polymerization of styrene in a medium of aliphatic solvents is a block-copolymer of a conjugated diolefin and styrene or a graft-copolymer of a conjugated diolefin and styrene or a mixture thereof. These products simultaneously serve as reinforcing agents.

At the same time, the stability of the polystyrene dispersion containing said block-copolymer in a medium of aliphatic solvents is increased. The process for producing a high-impact polystyrene composition involves polymerization of styrene in the presence of organic derivatives of alkali metals, as a catalyst, in an inert atmosphere in the presence of a block-copolymer consisting of at least one block of a monovinylaromatic polymer, a graft-copolymer prepared from a conjugated diolefin and a monovinylaromatic hydrocarbon or a mixture thereof as a reinforcing agent, and an aliphatic hydrocarbon solvent. The amount of said block-copolymer is selected so that the resulting high-impact polystyrene composition contains 1 to 30% by weight of the conjugated diolefin component as calculated for the total weight of the composition. On completion of styrene polymerization the polymers are separated by way of distilling-off the solvent or by filtration, followed by drying thereof and processing by thermocompression moulding. In this process it is preferred to employ block-copolymers containing 1 to 5 blocks of a polymer of a conjugated diolefin and 2 to 5 blocks of styrene polymer. As the conjugated diolefin use is made of butadiene, isoprene or a mixture thereof. Such block-copolymers display thermoplasticity and elasticity in the non-vulcanized condition.

In British Pat. No. 1,206,800 there are Examples illustrating the process for producing an impact-resistant polystyrene composition making use of said block-copolymers having a linear arrangement of blocks such as polybutadiene-polystyrene, polystyrene-polybutadiene-polystyrene, polystyrene-polyisoprene-polystyrene, or polybutadiene-polystyrene-polystyrene-polybutadiene.

However, the use of a block-copolymer containing one polybutadiene and one polystyrene block and having no strength and elasticity in the non-vulcanized condition is less efficient in said prior art process. The British Patent teaches that the principal condition for better impact-resistance of the resulting composition resides in a specified arrangement of the block-copolymer in the resulting polystyrene which is obtained when the polymerization process is conducted in an aliphatic solvent and the block-copolymer is co-precipitated along with styrene polymer in the form of a stable slurry. Other solvents such as aromatic and cycloaliphatic ones do not provide for an adequate improvement of the product properties even in the case of using the most preferable copolymers possessing thermoplasticity and elasticity in the non-vulcanized condition. It is also stated that the process effectiveness is ensured due to the use of an organo-alkaline metallic catalyst which causes polymerization of styrene into a linear chain and does not result in the formation of branches and cross-linking in the reinforcing agent employed, wherefore the thus-prepared composition contains no gel. Branching or cross-linking in the reinforcing agent being added or in the resulting polystyrene is considered to be the main reason of origination of micro- and macro-structural defects in the resulting composition thus impairing its impact-resistance.

The process disadvantage resides in the use of block-copolymers having no strength on their own and elasticity, the resulting high-impact composition has rather low impact-resistance and elasticity. For this reason, the use of such block-copolymers as, for example, two-block copolymer (polybutadiene-polystyrene) in a commercial process is impossible, whereas block-copolymers containing at least one block of a conjugated diolefin polymer and at least two blocks of polystyrene are produced by rather complicated technology.

Manufacture of moulded samples of said high-impact polystyrene composition is performed by hot-compression moulding. However, during processing of said composition by extrusion or injection moulding, the article properties are impaired. Under the influence of shear forces acting on the composition melt, in the processes of extrusion and injection moulding (these processes are most employed for processing of thermoplastics) there occurs breaking of the original arrangement of distribution of block- or graft-copolymer or a mixture thereof in polystyrene. This is one of the reasons of impaired physico-mechanical properties of the final moulded articles.

The effect of shear forces on the composition structure in the melt is most pronounced in the case where the block-copolymer employed per se displays no thermoplastic properties.

Another disadvantage of said process resides with the use of an aliphatic solvent wherein adherence of the polymer to the polymerizing apparatus walls is observed which cannot be completely eliminated even in the case where the dispersing agent is made of the block-copolymers of a conjugated diolefin and styrene described in said Patent.

It is an object of the present invention to overcome the above-mentioned disadvantages inherent in the prior art processes.

It is the main object of the present invention to obtain high-impact polystyrene possessing an increased mechanical strength, elasticity and impact-resistance and retaining its high physico-mechanical properties after processing thereof by extrusion and injection-moulding.

It is another object of the present invention to simplify the process technology and to obtain high-impact polystyrene possessing different properties depending on the final application thereof.

Said main and other objects of the present invention are accomplished by polymerization of styrene in the presence of a reinforcing agent, viz. a conjugated diolefin polymer, random copolymer, graft-copolymer or block-copolymer of a conjugated diolefin with styrene or a mixture of said polymers and/or copolymers and an anionic catalyst based on organic derivatives of alkali metals or adducts thereof in a medium of inert hydrocarbon solvents such as aliphatic, cycloaliphatic, aromatic solvents or mixtures thereof, followed by isolation of the desired product. In accordance with the present invention, on completion of polymerization the resulting polymer is subjected to crosslinking by means of peroxide compounds or redox systems.

As the polymeric reinforcing agent it is advisable to employ star-shaped 3-12 branch butadiene-styrene block-copolymer, each branch thereof being constituted by 1-2 polybutadiene and 1-2 polystyrene blocks at a total content of bound butadiene in the block-copolymer within the range of from 30 to 80% by weight, or a linear two-block unit polybutadiene-polystyrene. To obtain high-impact polystyrene possessing predetermined properties, on completion of polymerization of styrene, to the reaction mass is added, prior to cross-linking, a polymeric reinforcing agent in an amount ensuring the bound diolefin content in the resulting polymer within the range of from 4 to 30% by weight.

As the oxidizing agent in the redox systems according to the present invention use is made of organic peroxide compounds, whereas as the reducing agent use is made of sulphurous anhydride.

As the organic peroxide compounds it is preferable to employ isopropylbenzene hydroperoxide, tert. butyl hydroperoxide, dicumyl peroxide, tert.butyl perbenzoate, isopropylcyclohexylbenzene hydroperoxide, methane hydroperoxide.

It is desirable that the oxidizing agent and reducing agent be taken in a molar ratio of 0.1-1:1. Cross-linking by means of redox systems may be performed in the presence of an organometallic compound as an activating additive at a molar ratio between oxidizing agent:organometallic:reducing agent compound of 0.1-1:1:0-.1-1.

The process according to the present invention is performed in the following manner.

First, there is prepared a conjugated diolefin polymer or a copolymer of a conjugated diolefin and styrene.

As the conjugated diolefins it is preferable to employ butadiene, isoprene or a mixture thereof, though use may be also made of 2,3-dimethylbutadiene, piperilene and the like. Polymers of said diolefins are produced by anionic polymerization of corresponding monomers by means of lithiumorganic catalysts, Ziegler-Natta catalysts in a medium of conventional hydrocarbon solvents or using the method of radical polymerization.

Random copolymers of conjugated diolefins with styrene are obtained as a result of copolymerization of a mixture of corresponding monomers in a solvent medium using lithium-organic catalysts and additives serving to make close polymerization constants. Without the additives such copolymers may be obtained only by utilization of special technological steps. For example, to obtain a butadiene-styrene random copolymer, a mixture of the monomers and a lithium-organic catalyst is continuously added into a reactor ensuring a high degree of mixing. The supply rate of the monomer mixture into the reactor is maintained equal to or above that of the polymer chain growth.

Usually, upon addition of a lithium-organic catalyst to a mixture of butadiene or isoprene with styrene in a medium of aliphatic, cycloaliphatic or aromatic solvents, first polymerized is the conjugated diolefin and then styrene. This results in the formation of a block-copolymer containing one block of the conjugated diolefin polymer and one polystyrene block linearily attached thereto thus forming a two-block unit of the type polybutadiene-polystyrene. This block-copolymer is "living", since at the terminal of the polystyrene block, active lithium is contained capable of initiating polymerization upon charging an additional amount of the conjugated diolefin or a mixture thereof with styrene.

As a result of polymerization of an additional amount of a conjugated diolefin such as butadiene at the "living" polystyrene terminal of the polybutadiene-polystyrene two-block unit, a three-block unit of the type polybutadiene-polystyrene-polybutadiene is formed containing active lithium at the terminal of the last polybutadiene block, i.e. polybutadiene-polystyrene-polybutadiene-lithium. If a solution of the "living" two-block unit containing active lithium at the terminal of the polystyrene block is added with a mixture of a conjugated diolefin and styrene, then after polymerization a "living" four-block unit is obtained such as, for example, polybutadiene-polystyrene-polybutadiene-polystyrene-lithium which is also capable of initiating polymerization. If styrene is first polymerized by using an organolithium catalyst and then a conjugated diolefin is added thereto, a two-block unit is obtained such as polystyrene-polybutadiene-lithium.

By alternating the supply of a conjugated diolefin and styrene or supplying a mixture of these monomers portion-wise, it is possible to obtain block-copolymers of a linear structure with a sufficiently great number of polystyrene and polybutadiene blocks. However, a compulsory condition for conducting such a synthesis resides in the absence, in the monomers, in the solvent and reaction atmosphere, of such impurities which are capable of deactivating the organolithium catalyst. Such impurities may be exemplified by compounds having active hydrogen such as water, phenols, amines, organic carboxylic acids as well as oxygen, carbonyl compounds, peroxide compounds, carbon dioxide, acetylene compounds and the like.

Therefore, in the synthesis of multi-block copolymers it is practically very difficult to conduct more than three polymerization steps due to the fact that it is impossible to completely purify the monomers and solvent from impurities as well as to exclude entrapment of impurities from the ambient medium. For this reason, upon addition of each successive portion of the monomers, a portion of the catalyst or "living" block-copolymer becomes inactive and incapable of initiating polymerization.

Block-copolymers of a conjugated diolefin and styrene with an increased number of blocks can be successfully obtained by coupling the above-mentioned "living" linear block-copolymers containing active lithium with di-functional or poly-functional coupling agents. As such coupling agents use may be made of polyhalides, polyepoxides, polyaldehydes, polyketones, polyisocyanates, polyimines, polyvinylaromatic compounds containing at least two reactive functional groups. It is preferable to employ polyhalides of silicon, silicon tetrachloride, silicon tetrabromide; polyhalosilanes of the type $R(SiCl_3)_n$ wherein n is 1–4, R is a monovalent or polyvalent radical or hydrogen; or $R_2SiCl_2$ as well as polyhalopolysiloxanes such as $Si_2OCl_6$, $Si_3O_2Cl_8$, $Si_4O_3Cl_{10}$, $Si_5O_4Cl_{12}$.

Coupling of "living" block-copolymers of conjugated diolefins with bi-functional coupling agents such as dimethyldichlorosilane, diphenyldichlorosilane linear block-copolymers with a doubled size are formed, while the use of coupling agents with three and more functional groups results in the formation of star-shaped block-copolymers. For example, upon treating "living" block-copolymer polybutadiene-polystyrene-lithium with silicon tetrachloride there is formed a four-branch star-shaped block-copolymer (polybutadiene-polystyrene)$_4$Si. As a result of this coupling reaction deactivation of active lithium occurs in molecules of block-copolymer, whereas the molecular weight of the block-copolymer is increased by several times as compared to the original one.

These star-shaped 3–12 branch butadiene-styrene block-copolymers with each branch consisting of 1–2 polybutadiene and 1–2 polystyrene blocks are preferably employed in the process according to the present invention. Upon synthesis of such block-copolymers it is frequently sufficient to conduct two polymerization steps, while in certain cases where a mixture of butadiene and styrene is polymerized, one polymerization step is quite sufficient just as in the case of synthesis of a linear butadiene-styrene two-block unit. The coupling reaction occurs rather rapidly at a temperature within the range of from 20° to 120° C. and ends within a period of 5 to 60 minutes. Coupling agents are taken in an amount equivalent to that of active lithium incorporated in linear block-copolymers. Effectiveness of utilization of conjugated diolefin polymers, copolymers of a conjugated diolefin with styrene as a reinforcing agent in high-impact polystyrene is increased with increasing molecular weight of the reinforcing agent. It is preferred to employ reinforcing agents having a molecular weight of at least 180,000.

To obtain impact-resistant polystyrene, polymerization of styrene using an anionic catalyst is carried out in a medium of inert hydrocarbon solvents in the presence of the above-mentioned polymers of conjugated diolefin or copolymers of a conjugated diolefin and styrene or mixtures thereof. These polymers and copolymers should be preferably obtained and used directly in solutions in the same hydrocarbon solvents such as aliphatic, cycloaliphatic, aromatic or mixtures thereof which are used in the production of impact-resistant polystyrene. This makes it possible to avoid the necessity of preliminary dissolution thereof and purification from antioxidants and other impurities destroying the anionic catalyst.

As the anionic catalyst in the production of impact-resistant polystyrene use is made of organic derivatives of alkali metals such as alkyllithium, ethyllithium, propyllithium, n-butyllithium, sec.-butyllithium, amyllithium, hexyllithium, benzyllithium, benzylsodium, naphthalenesodium, and other lithium-organic, sodium-organic, potassium-organic, cesium-organic compounds as well as alkali metals lithium, sodium, potassium, rubidium, cesium or adducts thereof with, for example, alpha-methylstyrene, 1,1-diphenylethylene and the like.

To increase activity of the catalysts, the latter may be employed in combination with activating additives such as Lewis bases, tetrahydrofuran, ethers of ethylene glycol, propylene glycol, polyethylene- or polypropyleneglycols, tertiary amines, hexamethylphosphorus triamide, potassium butylate.

The starting styrene monomer and solvents are preliminarily purified from humidity and other impurities deteriorating the anionic catalyst. Elimination of humidity is preferably performed by azeotropic distillation or by contacting with sorbents such as alumina.

Thereafter, styrene is mixed with a solution of a conjugated diolefin polymer or a copolymer of a conjugated diolefin with styrene which has been already described hereinbefore, as a reinforcing agent, or said polymers or copolymers are dissolved in styrene. The polymeric reinforcing agent is taken in such an amount which after polymerization of styrene would ensure the combined diolefin content in the resulting polymeric product within the range of from 1 to 30% by weight and in certain cases even 0.1 to 3% by weight, i.e. where polymerization is conducted in aliphatic solvents.

The resulting solution of the polymeric reinforcing agent in styrene is diluted with an inert solvent such as aliphatic, cycloaliphatic or a mixture thereof so that the solvent concentration is within the range of from 50 to 90%, preferably from 60 to 80% by weight. It is preferred to use a mixture of aliphatic and cycloaliphatic solvents. Thereafter, the resulting solution is added with an anionic catalyst of polymerization in an inert atmosphere of such gases as nitrogen, argon, neon, helium. The catalyst amount is selected so as to obtain polystyrene with a molecular weight within the range of from 100 to 500 thousand. It should be noted, that a portion of the introduced catalyst may be consumed for bonding the impurities remaining in styrene, solvent and the employed polymeric reinforcing agent. Along with the catalyst or right after it the above-mentioned activating additives may be introduced. Depending on the anionic catalyst and the activating additive employed polymerization can be carried out at a temperature within the range of from −40° to +150° C. In the preferred embodiment contemplating the use of alkyllithium catalysts without any activating additives polymerization is conducted at a temperature within the range of from 20° to 120° C.

During the polymerization process, the reaction mass is agitated to ensure better heat removal. On completion of polymerization, in order to widen the range of high-impact polystyrene grades, the reaction mass may be added with additional amounts of the polymeric reinforcing agent. This in itself makes it possible to obtain high-impact polystyrene with various degrees of impact-resistance without changing the technological conditions of polymerization. In this case styrene polymerization is carried out with the smallest content of the polymeric reinforcing agent.

With the use of aliphatic solvents this technique is especially effective, since it makes possible substantial reduction of the viscosity of the reaction medium and the solvent concentration simultaneously with increasing concentration of the monomer in the solution. This contributes to increased output from the reaction volume at the step of polymerization. In this case the reinforcing agent concentration in the reaction mixture may be lowered down to 0.1% by weight.

Upon incorporation of an additional portion of the strengthening agent into the reaction mass in a solvent medium there occurs a uniform distribution of the polymeric reinforcing agent within the total volume of the polymer due to better conditions of diffusion processes. After reaching a diffusion equilibrium, an optimal distribution of the polymeric strengthening agent in the total mass of styrene polymer is achieved.

This is facilitated by the presence of a certain portion of the polymeric reinforcing agent already distributed within the styrene polymer and this distribution is ensured due to polymerization of styrene in the presence of a polymeric reinforcing agent in a medium of a hydrocarbon solvent using an anionic catalyst. To obtain the highest increase in impact-resistance of polystyrene with subsequent incorporation of an additional amount of reinforcing agent, it is necessary that the amount of said polymeric reinforcing agent added during styrene polymerization ensures separation of the resulting polystyrene into the dispersing phase. Particles of the polystyrene dispersion, depending on the chosen solvent, comprise a swollen polymer (in the case of aliphatic solvents) or a polystyrene solution in a cycloaliphatic solvent or in a mixture of aliphatic and a cycloaliphatic solvent or in a mixture of an aliphatic and aromatic solvent or in a mixture of all three solvents.

These particles contain a polymeric reinforcing agent which in this case act as a dispersing agent or a polymeric emulsifier.

In the case of shortage of the polymeric reinforcing agent as a dispersing agent or polymeric emulsifier at the stage of styrene polymerization the resulting polystyrene is not dispersed or emulsified in the solvent employed but forms a solid mass or a solution, wherein the polymeric reinforcing agent is contained in the form of very small inclusions. Such inclusions do not exert a reinforcing effect upon the styrene polymer.

Furthermore, viscosity of the reaction medium is substantially increased. Polymers of a conjugated diolefin or copolymers of a conjugated diolefin with styrene reveal their functions as a dispersing agent or polymeric emulsifier in a medium of aliphatic solvents at their dosage of more than 0.1% by weight with respect to the styrene monomer taken; in a medium of cycloaliphatic solvents—at a dosage of 3% by weight and higher; in mixed solvents this value is varied depending on the solvent composition. It also depends on the composition and molecular weight of the employed polymer of a conjugated diolefin or copolymer of a conjugated diolefin and styrene and may be readily found experimentally from minimum viscosity of the reaction mass.

Higher dosage of the reinforcing polymeric agent at the stage of styrene polymerization results in increased emulsifying function thereof and the reaction medium viscosity. For this reason, polymerization may be carried out a minimum or lowered viscosity with an underrated dosage of the reinforcing agent so as to obtain the required content of the polymeric reinforcing agent in high-impact polystyrene by introducing an additional amount of said agent on completion of the polymerization. This technique enables the production of high-impact polystyrene of the same quality as in the one-stage incorporation of the polymeric strengthening agent prior to styrene polymerization. It also makes possible lower viscosity and thus facilitates a widened range of high-impact polystyrene grades. Said additional amount of the reinforcing polymeric agent which is incorporated into the reaction mass on completion of styrene polymerization does not necessitate purification from the impurities deteriorating the anionic catalyst.

On completion of styrene polymerization or after incorporation, into the reaction mass, of an additional amount of the polymeric-reinforcing agent and intermixing thereof with the polymerization product, cross-linking of the resulting polymer is performed by means of peroxide compounds or redox systems.

As the peroxide compounds use is made of: peroxides or hydroperoxides of alkyls, cycloalkyls, arylalkyls, acyls; acylalkylperoxides, percarbonates such as ditert-.butylperoxide, dicumylperoxide, dibenzoylperoxide, dilaurylperoxide, cumyltert.butylperoxide, tert.butylhydroperoxide, cumylhydroperoxide, isopropylcyclohexylbenzene hydroperoxide, p-menthane hydroperoxide, monohydroperoxide or dihydroperoxide of diisopropylbenzene, mono-, di- and trihydroperoxide of triisopropylbenzene, dicyclohexylperoxycarbonate; peroxide compounds obtained by copolymerization of a peroxide monomer such as tert.butylperacrylate, with butadiene or styrene; peroxide compounds resulting from oxidation of "living" polymers of butadiene or styrene or "living" copolymers or block-copolymers of said monomers by means of oxygen and containing terminal peroxide functional groups. The peroxide compounds which are formed as a result of auto-oxidation of the polymers constituting the resulting high-impact polystyrene are also used in the process according to the present invention.

Use is preferably made of non-volatile peroxide compounds soluble in a hydrocarbon solvent which is employed in the production of high-impact polystyrene.

Generally, a peroxide compound is mixed with the resulting polymer in a medium of a hydrocarbon solvent.

The solvent is further distilled-off at a temperature within the range of from 60° to 150° C. and dried at a temperature within the range of from 100° to 200° C. Therewith, a temperature is reached exceeding the decomposition temperature of the peroxide compound and cross-linking of high-impact polystyrene occurs. During the cross-linking process a portion of the polymeric reinforcing agent is subjected to space cross-linking.

Cross-linking is responsible for a substantial increase in impact-resistance of the resulting polystyrene, mainly due to the fact that it fixes that optimal distribution of the strengthening agent within impact resistant polystyrene which has been achieved during polymerization or as a result of polymerization with subsequent incorporation of an additional amount of the reinforcing agent in a medium of a hydrocarbon solvent.

The use of redox systems makes it possible to substantially increase the cross-linking rate.

As an oxidizing agent of said redox systems use is made of the above-mentioned organic peroxide compounds, whereas as the reducing agent use is made of sulphurous anhydride.

Said oxidizing and reducing agents are incorporated into the polymer in succession upon vigorous stirring in a medium of a hydrocarbon solvent at a temperature within the range of from 0° to 100° C. Cross-linking is completed within a period of from 5 to 120 minutes. Activity of the cross-linking redox system is increased if the cross-linking is conducted in the presence of an organometallic compound which is introduced into the polymer prior to or after incorporation of the oxidizer, though before incorporation of the reducing agent. As the organometallic compound use is made of alkyl, cycloalkyl, alkoxyl derivatives of metals of group I and II such as ethyllithium, amyllithium, hexyllithium, benzyllithium, benzylsodium, naphthalenesodium, diethylzinc, triisobuthylaluminum, butoxides of potassium, sodium, lithium, barium, aluminum, and adducts of the above-mentioned metals with α-methylstyrene, diphenylethylene, and other aromatic compounds.

On completion of cross-linking various additives may be incorporated into the polymer such as antioxidants, stabilizers, fillers and the like.

Separation of the thus-prepared polymer is performed by distilling-off the solvent either by heating the polymer to a temperature within the range of from 60° to 150° C., or by pouring it into hot water at a temperature within the range of from 90° to 120° C., stirring and treating it with steam. In the latter case the polymer is obtained in the form of wet crumb. The crumb is dried, melted; the melt is extruded through round draw plates, granulated and cooled to give ready-to-use high-impact polystyrene. Such material has improved physico-mechanical properties: tensile strength impact-strength and elasticity. The main distinctive feature of this material resides in the presence of a gel in an amount of from 2 to 50% by weight as well as in the presence of occluded polystyrene within the phase of the polymeric reinforcing agent which is seen upon observation of an ultrathin section of the material through an electron microscope.

The presence of said gel in high-impact polystyrene enables retaining its high properties after processing by extrusion and injection moulding.

The process for producing impact-resistant polystyrene according to the present invention features substantially higher efficiency and better process conditions as compared to currently employed commercial processes.

The process according to the present invention makes it possible:

to reduce the duration of the technological cycle due to increased polymerization rate and avoiding the use of rubber as a starting material along with operations associated with its separation, stabilization, crushing and dissolution in styrene;

to reduce the polymerization temperature, decrease the reaction mass viscosity by 100–1000 times as compared to block-polymerization due to the use of hydrocarbon solvents (maximal viscosity in the process according to the present invention does not exceed $6.10^2$–$10^4$ centipoises, whereas in the block-polymerization process it is as high as $10^6$ centipoises.

to avoid the troubles associated with agitation and transportation of the reaction mass as well as to remove polymerization heat and eliminate the formation of chemically contaminated waste waters.

The impact-resistant polymeric material produced by the process according to the present invention possesses high physico-mechanical properties.

For a better understanding of the present invention the following Examples are given hereinbelow by way of illustration.

EXAMPLE 1

To a solution consisting of 40 parts by weight of styrene, 20 parts by weight of butadiene and 270 parts by weight of a solvent consisting of 80% by weight of cyclohexane and 20% by weight of hexane, there is added, in the atmosphere of purified nitrogen, an anionic catalyst, i.e. butyllithium at the rate of 30 mmol per kg of styrene and polymerization is then performed by gradually elevating temperature from 40° to 80° C. The resulting active copolymer is added with 40 parts by weight of butadiene in 190 parts by weight of the same solvent. On completion of the second polymerization stage, the reaction mass is added with silicon tetrachloride at the rate of 1 mole per 4 moles of the used catalyst and intermixed at a temperature within the range of from 60° to 80° C. for one hour. As a result of combination of said active polybutadiene-polystyrene-polybutadiene block-copolymer with silicon tetrachloride a 4-branch star-shaped butadiene-styrene block-copolymer is obtained, each branch thereof consisting of two polybutadiene and one polystyrene blocks with the total content of bound butadiene being equal to 60% by weight.

A solution of this star-shaped butadiene-styrene block copolymer is mixed with styrene in such a ratio which ensures, after styrene polymerization, the combined butadiene content of 10% by weight with respect to the total amount of the polymeric substances. The thus-prepared mixture is diluted with an additional amount of the previously employed solvent bringing its concentration up to 70% by weight. As the polymerization catalyst use is made of n-butyllithium which is introduced in the amount of 5 mmole per kg of styrene. Polymerization of styrene is carried out in an inert atmosphere for 2 hours with gradually increasing temperature from 40° to 80° C. under constant stirring of the reaction mass.

On completion of polymerization, the polymer is added with 4% by weight of isopropylbenzene hydroperoxide as calculated per the amount of bound butadiene, intermixed and sulphurous anhydride is added in the form of a 0.2 M solution in cyclohexane.

Dosage of sulphurous anhydride is selected at the rate of 1 mole per 1 mole of the hydroperoxide. Cross-linking is effected at a temperature within the range of from 20° to 40° C. for one hour. Thereafter, stabilizers are incorporated into the polymer: 0.5% by weight of trinonylphenylphosphite and 2,6-di-tert.butyl-4-methylphenol in the amount of 0.2% by weight; the solvent is then distilled-off, the polymer is dried, extruded in the form of rods which are then granulated to granules with a size of 3–4 mm.

To determine physico-mechanical properties of the product, samples are prepared from the granulated material by injection-moulding. Properties of the thus-produced impact-resistant polystyrene are shown in Table 1 hereinbelow.

EXAMPLE 2

A 4-branch star-like butadiene-styrene block-copolymer is prepared, each branch thereof consisting of one polybutadiene and one polystyrene block. To this end, a mixture of butadiene and styrene in the weight ratio of 60:40 respectively is polymerized in a solvent containing 80% by weight of cyclohexane and 20% by weight of hexane at the total concentration of the monomers of 14% by weight. Polymerization is carried out in one stage at the dosage of n-butyllithium of 4 mmol per kg of the monomers. The resulting polybutadiene-polystyrene two-block unit with active lithium at the terminal of the polystyrene block is treated with silicon tetrachloride as described in the foregoing Example 1 to obtain a star-shaped block-copolymer, wherein polystyrene blocks are located at the star center and polybutadiene blocks—at the star ends.

Production of high-impact polystyrene is conducted with the use of the above-described butadiene-styrene block-copolymer. Polymerization of styrene, separation thereof and processing of the manufactured sample are performed according to the procedure described in Example 1 hereinbefore, while cross-linking is conducted in the presence of an organometallic compound such as triisobutylaluminum, isopropylbenzene hydroperoxide and sulphurous anhydride.

Introduction of triisobutylaluminum into the polymer is effected after the hydroperoxide supply and sulphurous anhydride is admixed after achieving a complete distribution of the former two components within the polymer medium.

The hydroperoxide, sulphurous anhydride and triisobutylaluminum are taken in the molar ratio of 1:1:0.5 respectively. Properties of a sample manufactured of this high-impact polystyrene are shown in Table 1 hereinbelow.

EXAMPLE 3

A 4-branch star-like butadiene-styrene block-copolymer is prepared each branch thereof consisting of two polybutadiene and two polystyrene blocks. To this end, 27 parts by weight of butadiene, 27 parts by weight of styrene are polymerized in the presence of 375 parts by weight of cyclohexane and sec. butyllithium taken at the rate of 27 mmol per kg of the monomers. Thereafter, there are added 27 parts by weight of butadiene, 19 parts by weight of styrene and 220 parts by weight of cyclohexane and polymerization is continued at the active terminals of the block-copolymer prepared at the previous stage. On completion of polymerization, coupling of the active butadiene-styrene block-copolymer with silicon tetrachloride is performed to yield a star-shaped block-copolymer. Polymerization conditions are similar to those described in the foregoing Example 1. The star-shaped block-copolymer has polystyrene blocks at the star center and at the branch middle, while polybutadiene blocks are located at the middle and end of each branch.

Production of high-impact polystyrene is performed using the above-described butadiene-styrene block-copolymer. As the solvent use is made of cyclohexane. Dosage of the butadiene-styrene block-copolymer is effected so as to obtain high-impact polystyrene containing 5% by weight of bound butadiene. Conditions for styrene polymerization and cross-linking of the resulting polymer are similar to those described in the foregoing Example 1. Properties of a sample of the thus-produced high-impact polystyrene are shown in Table 1 hereinbelow.

EXAMPLE 4

Butadiene-styrene block-copolymer and impact-resistant polystyrene are produced in a manner similar to that described in the foregoing Example 2. Cross-linking is also performed as in Example 2, but the isopropylbenzene hydroperoxide, triisobutylaluminum and sulphurous anhydride are taken in the molar ratio of 0.8:1:1 respectively. Properties of a sample manufactured from this impact-resistant polystyrene are shown in Table 1 hereinbelow.

EXAMPLE 5

Butadiene-styrene block-copolymer and impact-resistant polystyrene are produced in a manner similar to that described in the foregoing Example 2. Cross-linking is also performed as in Example 2, but the isopropylbenzene hydroperoxide, triisobutylaluminum and sulphurous anhydride are taken in the molar ratio of 1:1:0.1. Properties of a sample manufactured from this impact-resistant polystyrene are shown in Table 1 hereinbelow.

EXAMPLE 6

Production of a butadiene-styrene block-copolymer and impact-resistant polystyrene is performed in a manner similar to the procedure described in Example 1 hereinbefore, except the use of toluene as the solvent. Properties of a sample manufactured of the thus-produced impact-resistant polystyrene are shown in Table 1 hereinbelow.

EXAMPLE 7

Impact-resistant polystyrene is produced by a procedure similar to that described in the foregoing Example 1, using a 3-branch star-shaped butadiene-styrene block-copolymer prepared as in Example 1 hereinbefore, except the use of methyltrichlorosilane instead of silicon tetrachloride. Properties of a sample manufactured from the thus-produced impact-resistant polystyrene are shown in Table 1 hereinbelow.

EXAMPLE 8

Impact-resistant polystyrene is produced in a manner similar to that described in the foregoing Example 1 using a 12-branch star-shaped butadiene-styrene block-copolymer prepared as in Example 2 but using vinyltrichlorosilane tetramer instead of silicon tetrachloride. Amount of cross-linking agents is reduced by two times as compared to that of Example 1. Properties of a sample of the thus-produced high-impact polystyrene are shown in Table 1 hereinbelow.

EXAMPLE 9

A mixture of butadiene and styrene is polymerized at the weight ratio of 55:45 in the medium of cyclohexane in just the same manner as in Example 2 to give a butadiene-styrene block-copolymer; on completion of polymerization the active polymer, however, is deactivated with the equimolar amount of 2,6-ditert.butyl-4-methylphenol. As a result, a solution of linear polybutadiene-polystyrene two-block block-copolymer is obtained.

Polymerization of styrene using the thus-prepared linear polybutadiene-polystyrene two-block block-copolymer is conducted in the medium of cyclohexane in a manner similar to that described in the foregoing Example 1. The resulting polymer is subjected to cross-linking as in Example 2, separated and processed as in previous Examples. Properties of a sample of the thus-produced high-impact polystyrene are shown in Table 1 hereinbelow.

EXAMPLE 10

A control sample of high-impact polystyrene is manufactured in a manner similar to that described in Example 9 hereinabove, without, however, conducting the cross-linking stage. Properties of the control sample are shown in Table 1 hereinbelow.

EXAMPLE 11

The experimental procedure and components are the same as in Example 1, but prior to cross-linking of the polymer on completion of styrene polymerization, the reaction mixture is additionally incorporated with an amount of the butadiene-styrene block-copolymer taken so as to ensure the content of bound butadiene in the final polymeric material increased from 10 to 20% by weight. The cross-linking is effected by means of tert-.butyl peroxide and sulphurous anhydride taken in the molar ratio of 1:1 at a temperature of from 50° to 60° C.

Tert.butyl peroxide is taken in the amount of 1% by weight of the bound butadiene. Properties of a sample manufactured from the thus-produced impact-resistant polystyrene are shown in Table 1 hereinbelow.

EXAMPLE 12

A mixture of butadiene and styrene (11 parts by weight mixed in the weight ratio of 70:30 respectively) is polymerized by means of n-butyllithium in a medium of a 89% aliphatic solvent containing 50% by weight of hexane and 50% by weight of heptane. The catalyst is added at the rate of 0.3–75 mg.-mol per 100 g of the total amount of the monomers. The thus-prepared polybutadiene-polystyrene two-block unit is employed in the following experiment.

To produce high-impact polystyrene, styrene is mixed with said two-block unit in such a ratio as to ensure the amount of bound butadiene in the added portion of the polybutadiene-polystyrene two-block unit equal to 0.96% by weight of the styrene taken for the reaction. Thereafter, the abovementioned aliphatic solvent is introduced by bringing its concentration in the mixture up to 70% by weight and a catalyst, i.e. n-butyllithium in the amount of 0.5 mg.-mol per 100 g of styrene and polymerization is then conducted with gradually increasing temperature from 40° to 100° C. under pressure of purified nitrogen.

The reaction mass comprises a mobile dispersion with polymer particle size ranging from 7 to 21μ and viscosity at most 5 centipoises. On completion of polymerization, said mass is cooled to 20° C. and deactivated by means of air oxygen so that terminal peroxide groups are introduced into the resulting polymer. Thereafter, to the reaction mass is added an additional amount of previously prepared block-copolymer and the content of bound butadiene is brought to 10% by weight of the total amount of the polymers. After agitation, the solvent is distilled-off with steam at a temperature within the range of from 60° to 105° C.; the polymer is dried and processes as in the foregoing Example 1. Cross-linking of the polymer is effected at the account of polystyreneperoxide compounds during separation and processing of polystyrene at the temperature above 60° C.

Properties of a sample manufactured from the thus-produced high-impact polystyrene are shown in Table 1 hereinbelow.

EXAMPLE 13

Polymerization of styrene is conducted in a manner similar to that described in the foregoing Example 12 in the presence of 1% by weight of polyisoprene with the molecular weight of 240,000.

The resulting styrene polymer is deactivated with oxygen and the reaction mass is added with a solution of the polybutadiene-polystyrene two-block block-copolymer in a manner similar to that of Example 12 hereinabove so as to ensure the total content of bound conjugated diolefin (butadiene and isoprene) equal to 10% by weight of the total amount of the polymers. The cross-linking procedure and that of separation of the resulting impact-resistant polystyrene is similar to those described in Example 12 hereinabove. The material properties are shown in Table 1 hereinbelow.

EXAMPLE 14

Polybutadiene-polystyrene two-block unit is prepared as in Example 7 hereinbefore in a medium of an aliphatic solvent comprising a mixture of hexane and heptane. Polymerization of styrene in the presence of this two-block unit is also conducted in a medium of an aliphatic solvent consisting of 50% by weight of hexane and 50% by weight of heptane. Polymerization conditions and proportions of the starting components are the same as in Example 1 hereinbefore. On completion of polymerization, the reaction mass is added with 0.6% by weight of isopropylbenzene hydroperoxide as calculated per the total amount of the polymer. The latter is outgassed and processed as in Example 1. Cross-linking occurs during separation and processing of the polymer at a temperature above the decomposition temperature of the hydroperoxide within the range of from 120° to 200° C.

Properties of a sample manufactured from the thus-produced high-impact polystyrene are shown in Table 1.

EXAMPLE 15

All the operations are performed as in the foregoing Example 14, except using dicumyl peroxide instead of isopropylbenzene hydroperoxide. Properties of a sample manufactured from the thus-produced high-impact polystyrene are shown in Table 1 hereinbelow.

EXAMPLE 16

All the operations are performed as in the foregoing Example 14, except using tert.butyl perbenzoate in the amount of 0.3% by weight of the polymer instead of isopropyl-benzene hydroperoxide. Properties of a sample manufactured from the thus-produced high-impact polystyrene are shown in Table 1 hereinbelow.

EXAMPLE 17

Butadiene-styrene random copolymer containing 74% by weight of bound butadiene and having Mooney viscosity of 84 is dissolved in styrene, then an aliphatic solvent is added, consisting of 50% by weight of hexane and 50% by weight of heptane, along with a catalyst, i.e. n-butyllithium.

Polymerization conditions and proportions of the starting components are the same as in the foregoing Example 1. On completion of polymerization, the reaction mixture is added with 4% by weight of tert.butyl hydroperoxide as calculated per the bound butadiene weight, whereupon triisobutylaluminum and sulphurous anhydride are added in succession in the molar ratio—hydroperoxide:organometallic compound:sulphurous anhydride=0.1:1:1.

Cross-linking conditions, those of separation and processing of the resulting high-impact polystyrene are as in Examples 1 and 2 hereinbefore. Properties of a sample manufactured from the thus-produced high-impact polystyrene are shown in Table 1 hereinbelow.

EXAMPLE 18

Polymerization of styrene in a medium of an aliphatic solvent consisting of 50% by weight of hexane and 50% by weight of heptane is performed in the presence of polybutadiene with the molecular weight of 285,000 taken in the amount of 10 parts by weight per 90 parts by weight of styrene. Polymerization conditions are similar to those described in the foregoing Example 1.

On completion of polymerization, the reaction mixture is added with 5% by weight of isopropylcyclohexylbenzene hydroperoxide as calculated for the polybutadiene employed, potassium butylate in the form of a dispersion in n-heptane, and sulphurous anhydride. Cross-linking is conducted in a manner similar to that described in Example 1 hereinbefore with the molar ratio between organometallic compound:hydroperoxide:sulphurous anhydride being equal to 1:1:0.9.

Properties of a sample manufactured from the thus-produced high-impact polystyrene are shown in Table 1 hereinbelow.

EXAMPLE 19

Procedure for the production of high-impact polystyrene is similar to that of Example 14, with the exception that the polymer cross-linking is effected by means of a redox system: isopropylbenzene hydroperoxide and sulphurous anhydride in the presence of naphthalene sodium with the molar ratio between the components being equal to 1:1:1 respectively.

Dosage of the hydroperoxide is taken at the rate of 4% by weight as calculated per the amount of bound butadiene.

Properties of a sample manufactured from the thus-produced high-impact polystyrene are shown in Table 1 hereinbelow.

Table 1

| | Production conditions | | | |
|---|---|---|---|---|
| | Polymeric reinforcing agent | | | |
| Example No. 1 | Type 2 | bound diolefin content, wt.% 3 | Solvent 4 | Cross-linking agents 5 |
| 1. | Star-shaped 4-branch butadiene-styrene block-copolymer: [polybutadiene-polystyrene-polybutadiene]4Si | 60 | Cyclohexane 80% Hexane 20% | Isopropylbenzene hydroperoxide Sulphurous anhydride |
| 2. | Star-shaped 4-branch butadiene-styrene block-copolymer: [polybutadiene-polystyrene]4Si | 60 | Same as in Example 1 | Triisobutylaluminum; isopropylbenzene hydroperoxide; sulphurous anhydride |
| 3. | Star-shaped 4-branch butadiene-styrene block-copolymer: [polybutadiene-polystyrene-polybutadiene-polystyrene]4Si | 54 | Cyclohexane | Isopropylbenzene hydroperoxide Sulphurous anhydride |

| | Properties of impact-resistance polystyrene | | | | |
|---|---|---|---|---|---|
| | Content of bound diolefin, % by weight 6 | Gel content % by weight 7 | Ultimate tensile, strength, kgf/cm² 8 | Ultimate elongation at rupture, % 9 | Impact-resistance by Sharpy (with a notch) kgf/cm² 10 | Vicat heat-resistance, °C. 11 |
| 1 | 10 | 24 | 319 | 32 | 18.4 | 106 |
| 2 | 10 | 15.3 | 293 | 38 | 21 | 102 |
| 3 | 5 | 8 | 364 | 22 | 6.5 | 106 |

| 1 | 2 | 3 | 4 | 5 |
|---|---|---|---|---|
| 4. | Star-shaped 4-branch butadiene-styrene block-copolymer: / polybutadiene-polystyrene/4Si | 60 | Cyclohexane 80% Hexame 20% | Isopropylbenzene hydroperoxide; Triisobutylaluminum Sulphorous anhydride. |
| 5. | Block-copolymer of Example 4 | 60 | Same as in Example 4 | Same as in Example 4 |
| 6. | Block-copolymer of Example 1 | 60 | Toluene | Same as in Example 3 |

Table 1-continued

| | | | | |
|---|---|---|---|---|
| 7. | Star-shaped 3-branch butadiene-styrene block-copolymer: [polybutadiene polystyrene-polybutadiene]₃SiCH₃ | 60 | Cyclohexane 80% Hexane 20% | Same as in Example 3 |
| 8. | Star-shaped 12-branch butadiene-styrene block-copolymer: [polybutadiene-polystyrene]₁₂ Si₄C₈H₁₂ | 60 | Same as in Example 7 | Same as in Example 3 |
| 9. | Linear butadiene-styrene two-block copolymer polybutadiene-polystyrene | 55 | Cyclohexane | Triisobutylaluminium; isopropylbenzene hydroperoxide; sulphurous anhydride |
| 10. | Block-copolymer of Example 9 | 55 | Same as in Example 9 | Non-cross-linked |

| | 6 | 7 | 8 | 9 | 10 | 11 |
|---|---|---|---|---|---|---|
| 4 | 10 | 16.7 | 338 | 41.4 | 18.5 | 104 |
| 5 | 10 | 6.1 | 304 | 29 | 13.4 | 103 |
| 6 | 10 | 11 | 344 | 18 | 11 | 104 |
| 7 | 10 | 19 | 325 | 29 | 14.8 | 106 |
| 8 | 10 | 22 | 285 | 14.8 | 20.5 | 102 |
| 9 | 10 | 21 | 354 | 29 | 13.8 | 106 |
| 10 | 10 | 1.0 | 366 | 8.2 | 3.2 | 106 |

| 1 | 2 | 3 | 4 | 5 |
|---|---|---|---|---|
| 11. | Block-copolymer of Example 1 | 60 | Cyclohexane 80%, hexane 20% | Tert.butyl peroxide, sulphurous anhydride |
| 12. | Linear butadiene-styrene two-block copolymer polybutadiene-polystyrene | 70 | Hexane 50% Heptane 50% | Polystyrylperoxide compounds |
| 13. | Polyisoprene. Block-copolymer of Example 12. | 100 70 | Same as in Example 12 | Polystyrylperoxide compounds |
| 14. | Block-copolymer of Example 9 | 55 | Same as in Example 12 | Isopropylbenzene hydroperoxide |
| 15. | Block-copolymer of Example 9 | 55 | Same as in Example 12 | Dicumyl peroxide |
| 16. | Block-copolymer of Example 9 | 55 | Same as in Example 12 | Tert.butyl perbenzoate |
| 17. | Butadiene-styrene random copolymer | 74 | Same as in Example 12 | Tert.butyl hydroperoxide triisobutylaluminum, sulphurous anhydride |
| 18. | Polybutadiene | 100 | Same as in Example 12 | Potassium butylate, isopropylcyclohexylbenzene hydroperoxide; sulphurous anhydride |
| 19. | Block-copolymer of Example 9 | 55 | Same as in Example 12 | Naphthalene sodium, isopropylbenzene hydroperoxide; sulphurous anhydride. |

| | 6 | 7 | 8 | 9 | 10 | 11 |
|---|---|---|---|---|---|---|
| 11 | 20 | 33.5 | 214 | 33 | 30.4 | 98 |
| 12 | 10 | 19.2 | 264 | 23 | 20.2 | 101 |
| 13 | 10 | 18.6 | 245 | 24 | 19.4 | 100 |
| 14 | 10 | 20.1 | 346 | 15.1 | 18.4 | 106 |
| 15 | 10 | 17.7 | 307 | 9 | 19.5 | 98 |
| 16 | 10 | 8.7 | 278 | 19 | 13.8 | 99 |
| 17 | 10 | 8.2 | 310 | 22 | 12.1 | 101 |
| 18 | 10 | 7.6 | 328 | 21 | 7.8 | 105 |
| 19 | 10 | 11.5 | 322 | 36 | 19.8 | 105 |

What is claimed is:

1. A process for producing high-impact polystyrene comprising polymerization of styrene in the presence of a strengthening agent selected from the group consisting of a conjugated diolefin polymer or a random copolymer, graft-copolymer, or block copolymer of a conjugated diolefin with styrene, mixtures thereof, and an anionic catalyst selected from the group consisting of a catalyst based on organic derivatives of alkali metals and adducts thereof, in a medium of hydrocarbon solvents selected from the group consisting of aliphatic, cycloaliphatic, aromatic solvents or mixtures thereof, cross-linking the polymer in the solvent media, after polymerization, by means of redox systems.

2. A process as claimed in claim 1, wherein as the polymeric reinforcing agent use is made of a 3-12-branch butadiene-styrene block-copolymer, each branch thereof containing 1-2 polybutadiene and 1-2 polystyrene blocks at a total content of bound butadiene in the block-copolymer ranging from 30 to 80% by weight.

3. A process as claimed in claim 1, wherein in order to obtain high-impact polystyrene having predetermined properties, on completion of styrene polymerization, to the reaction mass, prior to cross-linking, said polymeric reinforcing agent is added in an amount ensuring a content of the combined diolefin in the resulting polymer within the range of from 4 to 30% by weight.

4. A process as claimed in claim 1, wherein as the oxidizing agent in said redox systems use is made of organic peroxide compounds.

5. A process as claimed in claim 4, wherein as the organic peroxide compounds use is made of compounds selected from the group consisting of iospropylbenzene hydroperoxide, tert.butyl hydroperoxide, tert.butyl peroxide, dicumyl peroxide, tert.butylperbenzoate, isopropylcyclohexylbenzene hydroperoxide.

6. A process as claimed in claim 1, wherein as the reducing agent in said redox systems use is made of sulphurous anhydride.

7. A process as claimed in claim 1, wherein the oxidizing and reducing agents are taken in a molar ratio of 0.1-1:1.

8. A process as claimed in claim 1, wherein cross-linking by means of redox systems is conducted in the presence of an organometallic compound at a molar ratio oxidizing agent:organometallic compound:reducing agent equal to 0.1-1:1:0.1-1:1.

9. A process for producing high-impact polystyrene comprising:

(a) contacting styrene, with a strengthening agent selected from the group consisting of conjugated diolefin polymers or random copolymers, graft-copolymers, or block-copolymers of a conjugated diolefin with styrene, and mixtures thereof, in an inert hydrocarbon solvent, to form a solution of polymeric reinforcing agent in styrene, the amount of said reinforcing agent being sufficient to ensure the combined diolefin content in the polymeric product ranges from 0.1 to 30%, by weight;

(b) diluting the solution of polymeric reinforcing agent in styrene with an inert hydrocarbon solvent selected from the group consisting of aliphatic, cycloaliphatic, aromatic solvent and mixtures thereof, so that said solvent concentration ranges from 50-90% by weight;

(c) contacting the dilute solution of polymeric reinforcing agent and styrene with an anionic catalyst selected from the group consisting of organic derivatives of alkali metals and adducts thereof, wherein the amount of said catalyst is sufficient to ensure a polymer molecular weight varying from 100-500 thousand; and (d) cross-linking the polymerized styrene in the solvent media with peroxide compounds.

* * * * *